(12) United States Patent
Dean et al.

(10) Patent No.: US 8,047,753 B2
(45) Date of Patent: Nov. 1, 2011

(54) INSULATING WASHERS

(75) Inventors: Thomas A. Dean, Maple Valley, WA (US); John George Kladouris, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 542 days.

(21) Appl. No.: 12/177,425

(22) Filed: Jul. 22, 2008

(65) Prior Publication Data

US 2010/0021268 A1 Jan. 28, 2010

(51) Int. Cl.
*F16B 43/00* (2006.01)
*B21D 53/20* (2006.01)

(52) U.S. Cl. ............................ 411/531; 411/903; 470/41

(58) Field of Classification Search .................. 411/531, 411/900–903; 470/41
See application file for complete search history.

(56) References Cited

U.S. PATENT DOCUMENTS

| | | | |
|---|---|---|---|
| 3,493,026 A | 2/1970 | Stotler et al. | |
| 3,670,618 A * | 6/1972 | Jellison | 411/371.1 |
| 3,736,394 A * | 5/1973 | Rumbaugh | 200/572 |
| 3,945,704 A * | 3/1976 | Kraus et al. | 439/411 |
| 4,214,444 A * | 7/1980 | Fujioka et al. | 60/322 |
| 4,214,505 A | 7/1980 | Aimar | |
| 4,686,808 A | 8/1987 | Triplett | |
| 4,717,302 A * | 1/1988 | Adams et al. | 411/378 |
| 4,793,029 A | 12/1988 | Burke | |
| 5,249,878 A * | 10/1993 | Frumkin | 403/291 |
| 5,489,180 A * | 2/1996 | Ichihara et al. | 411/544 |
| 5,653,564 A | 8/1997 | Nakamura | |
| 5,988,966 A | 11/1999 | Chen et al. | |
| 6,086,972 A | 7/2000 | Rayburn et al. | |
| 7,584,582 B1 | 9/2009 | Hutter, III | |
| 7,897,241 B2 * | 3/2011 | Rice | 428/137 |
| 2005/0100425 A1 | 5/2005 | Wu | |

OTHER PUBLICATIONS

USPTO office action for U.S. Appl. No. 12/177,412 dated Aug. 20, 2010.

* cited by examiner

*Primary Examiner* — Flemming Saether

(74) *Attorney, Agent, or Firm* — Yee & Associates, P.C.

(57) ABSTRACT

A washer comprises a ring and a composite structure attached to the ring. The composite structure has a slotted shape and a hole that is centrally located with respect to an axis passing through the ring.

19 Claims, 10 Drawing Sheets

INSULATING WASHERS

CROSS REFERENCE TO RELATED APPLICATION

The present invention is related to the following patent application: entitled "Insulating Cover for Fasteners Used in High Temperature Environments", Ser. No. 12/177,412, filed Jul. 22, 2008, assigned to the same assignee, and incorporated herein by reference. The referenced patent application has now issued as U.S. Pat. No. 7,878,747.

BACKGROUND INFORMATION

1. Field

The present disclosure relates generally to fastener systems and in particular to a method and apparatus for insulating fasteners and structures attached to fasteners.

2. Background

Aircraft are being designed and manufactured with greater and greater percentages of composite materials. Some aircraft may have more than fifty percent of its primary structure made from composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials created by combining two or more dissimilar components. For example, a composite may include fibers and resins. The fibers may be in the form of a substrate or matrix. For example, the fibers may take the form of a woven cloth. The resin may form a reinforcement for the substrate. The fibers and resins are combined and cured to form a composite material.

Further, by using composite materials, portions of an aircraft may be created in larger pieces or sections. For example, a fuselage in an aircraft may be created in cylindrical sections that may be put together to form the fuselage of the aircraft. Other examples include, for example, without limitation, wing sections joined to form a wing or stabilizer sections joined to form a stabilizer.

During use, unexpected impacts, or other conditions, delamination may occur between the interface between two layers in a structure made of composite materials. Delamination is a condition in which the layers in a structure may separate. These types of conditions may be detected through various monitoring and scanning systems. The different advantageous embodiments recognize that it would be desirable to manufacture composite structures in the manner that overcomes the problems described above.

SUMMARY

In one advantageous embodiment, a washer comprises a ring and a composite structure attached to the ring. The composite structure has a slotted shape and a hole that is centrally located with respect to an axis passing through the ring.

In another advantageous embodiment, an insulating washer comprises a ring and a plurality of composite layers folded over the ring to form a peripheral edge with slots around a hole that is centrally located in the insulating washer. The peripheral edge is raised with respect to an inner portion of the plurality of composite layers. Each layer within the plurality of composite layers comprises of fibers and a matrix material.

In yet another advantageous embodiment, a method is present for manufacturing an insulating washer. A plurality of composite layers is created. The plurality of composite layers is folded over a ring to form a peripheral edge for the insulating washer.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
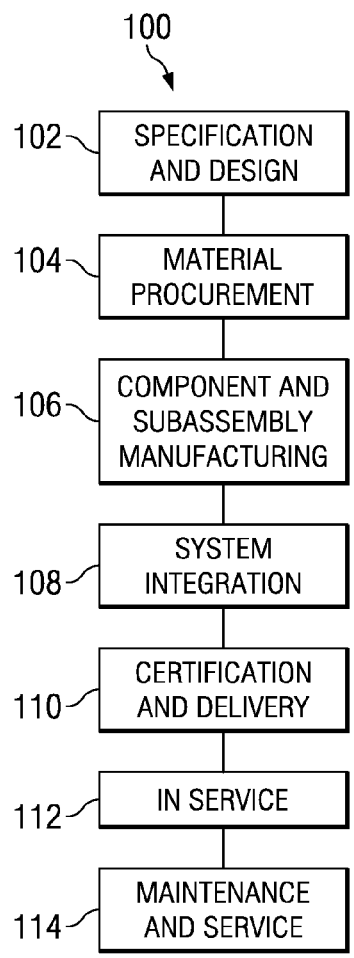
FIG. 1 is a diagram illustrating an aircraft manufacturing and service method in which an advantageous embodiment may be implemented.
Figure 2:
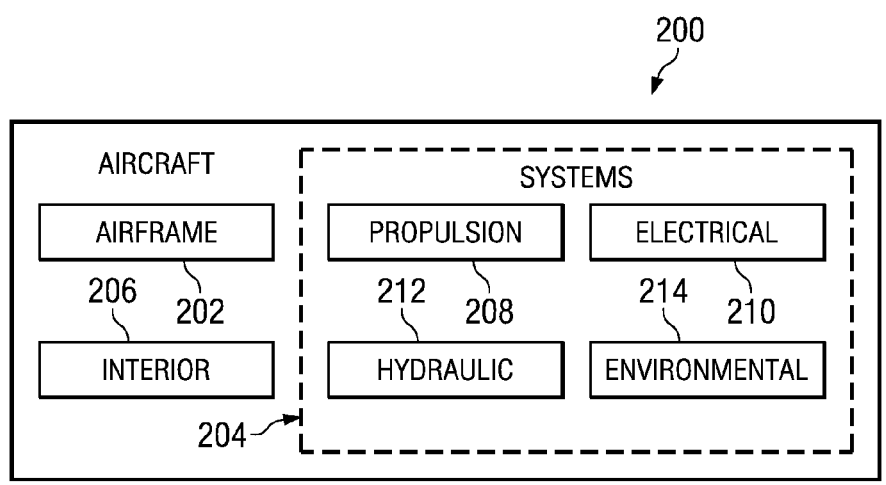
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize and take into account that delamination may occur with respect to certain structures when exposed to heat. For example, the different advantageous embodiments recognize that a composite and metallic fastener attached to a composite structure may detach or delaminate with respect to that composite structure when exposed to heat. The different advantageous embodiments recognize that this situation may occur with respect to detachment of installation blankets to composite panels for an aircraft engine.

Thus, the different advantageous embodiments provide a method and apparatus for reducing the heat exposure of a fastener. The different advantageous embodiments may use an insulating washer capable of receiving a fastener and a cover having a peripheral edge. The cover has a peripheral edge that is capable of being secure to the insulating washer. When the cover and the insulating washer are secured to each other, an insulating volume is created. This insulating volume may reduce the amount of heat exposure of the fastener and/or a nut secured to the fastener. Further, the cover itself also may include insulating layers to further reduce the amount of heat that may be translated or traveled to the fastener.

Figure 3:
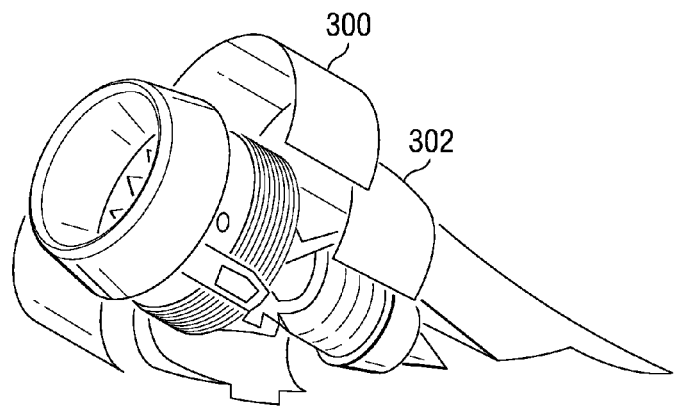
FIG. 3 is a diagram of a portion of an aircraft engine in accordance with an advantageous embodiment.

With reference now to FIG. 3, a diagram of a portion of an aircraft engine is depicted in accordance with an advantageous embodiment. In this example, aircraft engine 300 is an example of an aircraft engine that may be part of propulsion 208 for aircraft 200 in FIG. 2. In this example, insulating structures may be present for composite panels used for thrust reverser 302 in engine 300.

Figure 4:
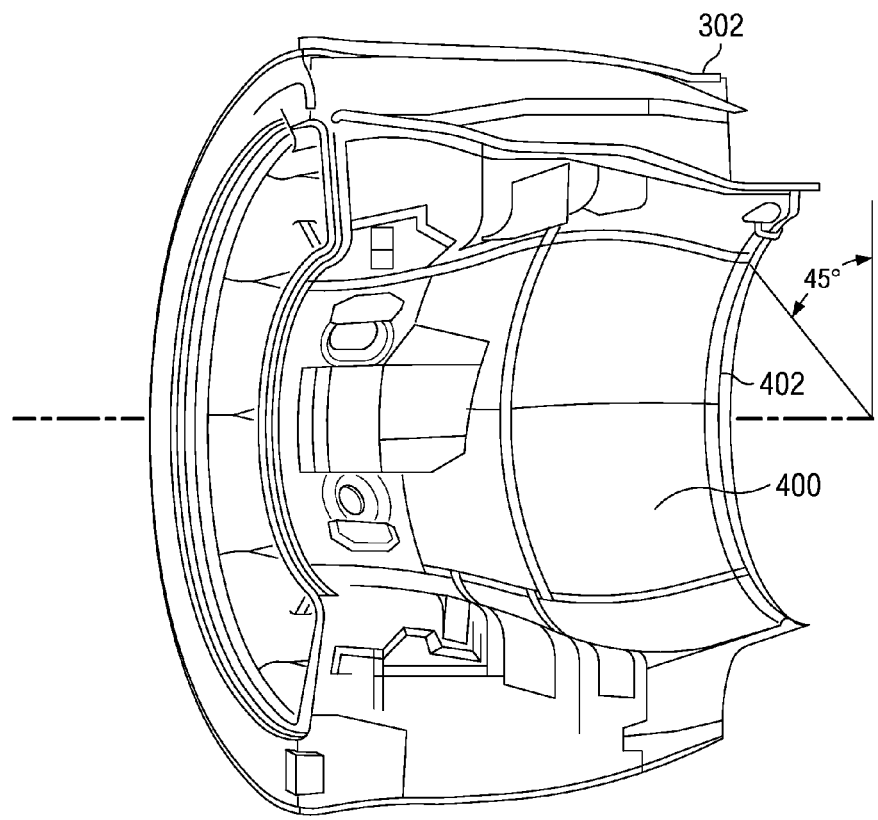
FIG. 4 is a more detailed illustration of a thrust reverser in accordance with an advantageous embodiment.

With reference now to FIG. 4, a more detailed illustration of a thrust reverser is depicted in accordance with an advantageous embodiment. In this example, thrust reverser 302 contains insulating blankets 400 that cover composite panels 402 within thrust reverser 302. Insulating blankets 400 are attached to composite panels 402 through fasteners, which are not shown in this view.

Figure 5:
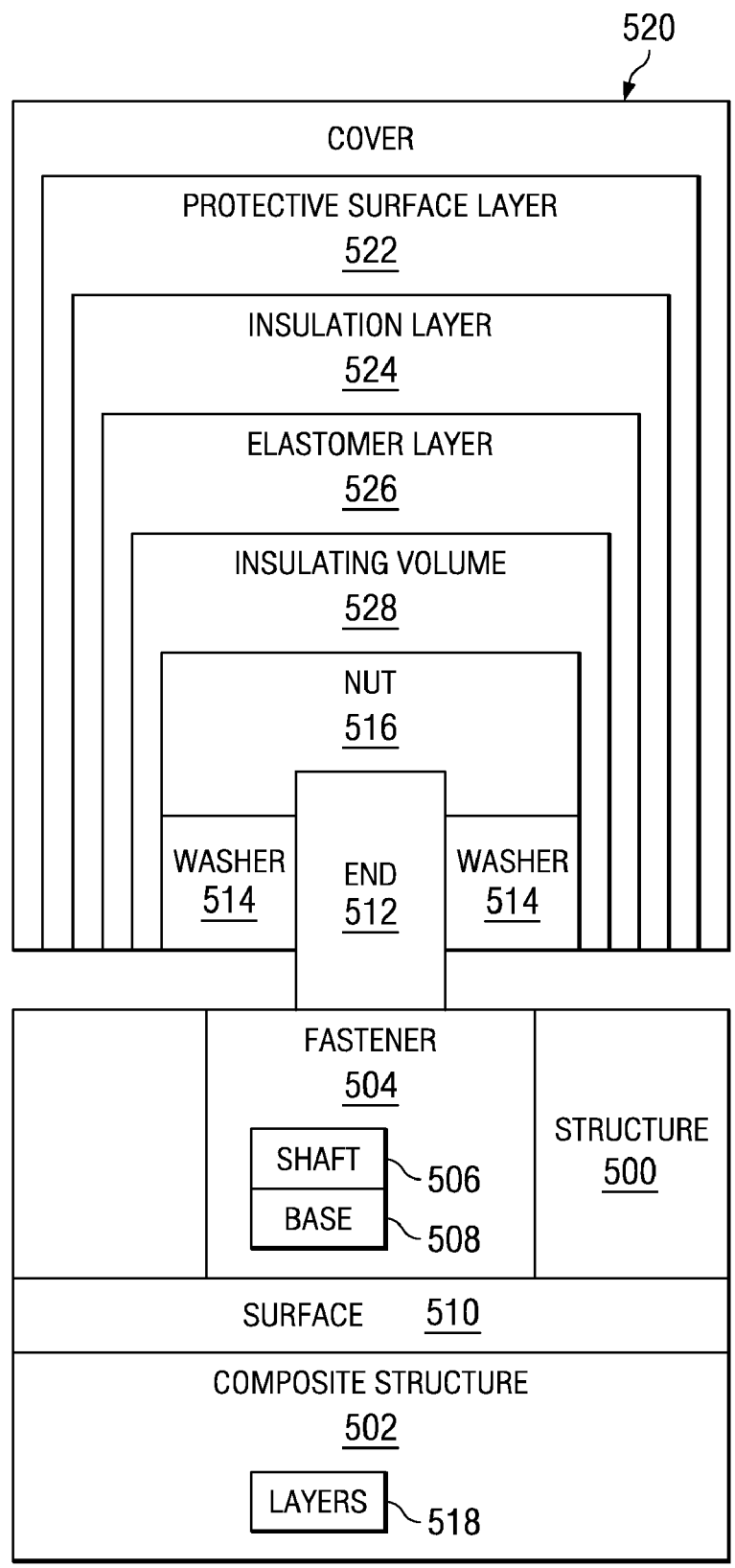
FIG. 5 is a functional block diagram illustrating a fastening system for a composite structure in accordance with an advantageous embodiment.

With reference now to FIG. 5, a functional block diagram illustrating a fastening system for a composite structure is depicted in accordance with an advantageous embodiment. In this example, structure 500 is connected to composite structure 502 using fastener 504. Fastener 504 may be a composite fastener or may contain both metal and composite materials. In this particular example, shaft 506 is made of metal while base 508 is made of a composite material.

The composite material may consist of a matrix and one or more reinforcements. The matrix may consist of a metal, such as aluminum, a plastic, such as a thermoset or a thermoplastic or a ceramic, such as an oxide ceramic or a non-oxide ceramic. The reinforcement may consist for example of fibers, grains, platelets or mixtures thereof consisting of one or more of minerals, metals and ceramics. One common composite material that might be used for the base of fastener 504 would be a carbon fiber reinforced epoxy.

As can be seen in this example, fastener 504 is bonded to surface 510 of composite structure 502. Fastener 504 passes through structure 500 in which end 512 may be secured using washer 514 and nut 516. In these examples, washer 514 is an insulating washer and may be made of any material having insulating properties.

When structure 500 take the form of an insulating structure such as, for example, an insulating blanket within an engine thrust reverser, nut 516 and/or fastener 504 may be subjected to heat under normal operating conditions. Without the different advantageous embodiments, this heat may travel through shaft 506 and to base 508 and surface 510. Heat applied to surface 510 may cause delamination or separation between base 508 and composite structure 502. In other advantageous embodiments, this heat may travel into the interior of composite structure 502 and may cause delamination in layers 518 within composite structure 502. Layers 518 may be, for example, two face sheets and a core between the face sheets.

The different advantageous embodiments reduce the transfer of heat through nut 516 and/or fastener 504 in one way using cover 520. In these examples, cover 520 may include protective surface layer 522, insulation layer 524, and elastomer layer 526. Cover 520 engages washer 514 in a manner that forms insulating volume 528. Insulating volume 528 may retain air as insulation against heat that may be present.

Protective surface layer 522 may provide a protective layer for insulation layer 524 and elastomer layer 526. Protective surface layer 522 may take various forms. For example, protective surface layer 522 may be a metal foil. Protective surface layer 522 may be formed using various materials such as, for example, steel, nickel alloys, titanium, aluminum, ceramic, or some other suitable material. Protective surface layer 522 functions to provide a fluid tight cover that may withstand the temperature of an operating environment in these examples.

Insulation layer 524 may prevent heat from passing to fastener 504 in conjunction with insulating volume 528. In other advantageous embodiments, insulation layer 524 may merely serve to protect elastomer layer 526 from heat. Insulation layer 524 functions to maintain elastomer layer 526 within a range of temperatures that allows elastomer layer 526 to continue to function to hold cover 520 in place with washer 514. Insulation layer 524 may be constructed from various materials with insulating properties. These materials include, for example, ceramic paper, ceramic felt, packed ceramic powder, glass paper, glass felt, glass batting, and other suitable materials.

In these depicted examples, elastomer layer 526 is a component in cover 520 that engages washer 514. This engagement may occur at the peripheral edge of elastomer layer 526 and the peripheral edge of washer 514. Elastomer layer 526 may take various forms. For example, elastomer layer 526 may be made of silicone or other suitable material that allows for engagement of cover 520. In these examples, elastomer layer 526 may stretch to engage the peripheral edge of washer 514.

In other advantageous embodiments, cover 520 may include other layers in addition to or in place of these layers. Further, cover 520 may also omit certain layers depending on the particular implementation. For example, in some advantageous embodiments only protective surface layer 522 may be needed if protective surface layer 522 is capable of engaging washer 514 to form insulating volume 528.

The illustration of the fastening system in FIG. 5 is provided for purposes of illustrating functional features that may be found in some advantageous embodiments and not meant to imply physical or architectural limitations to the manner in which different features may be implemented.

Figure 6:
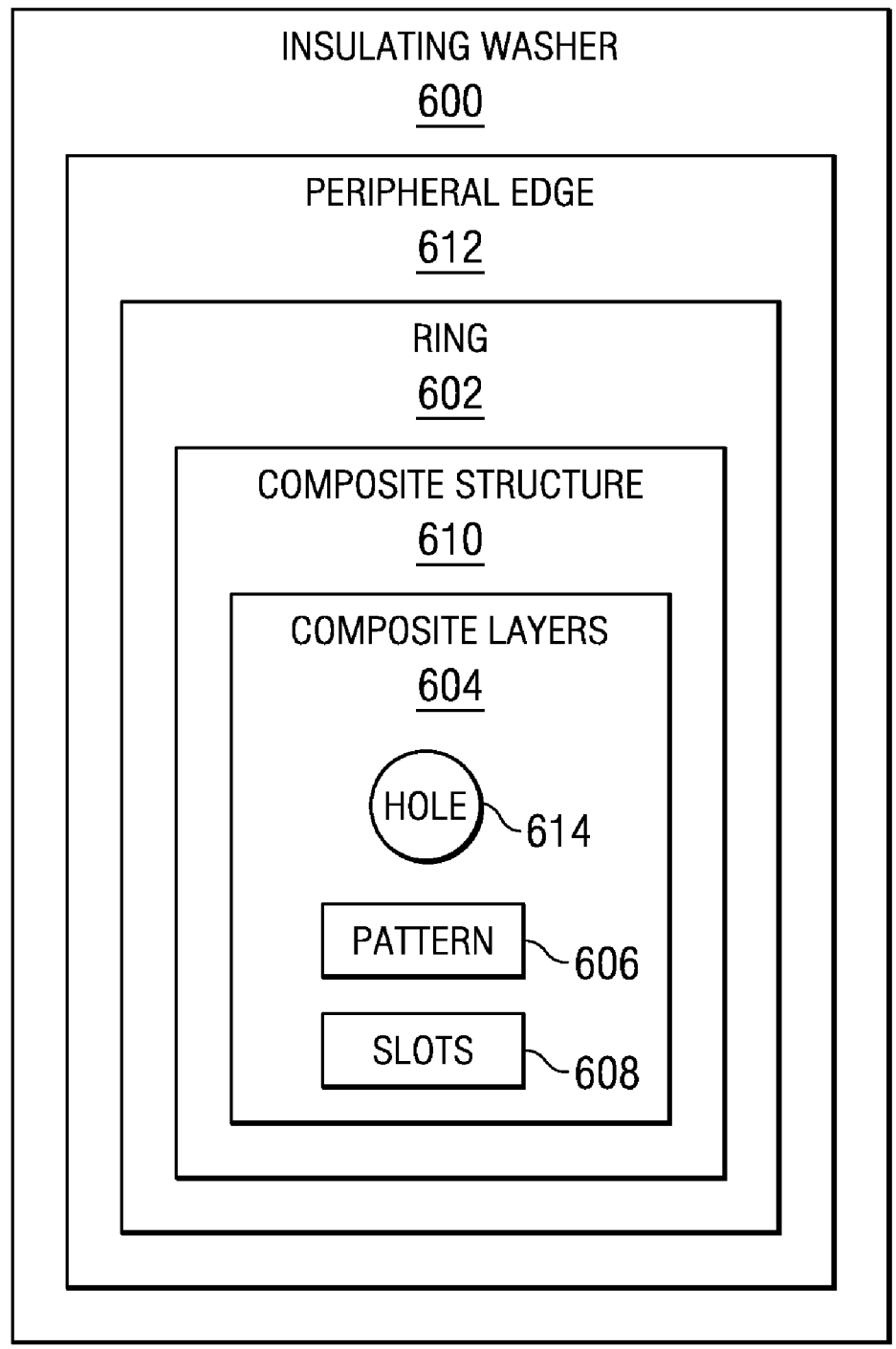
FIG. 6 is a functional block diagram illustrating a washer in accordance with an advantageous embodiment.

With reference now to FIG. 6, a functional block diagram illustrating a washer is depicted in accordance with an advantageous embodiment. In this example, insulating washer 600 is a composite washer which may be used to implement washer 514 in FIG. 5. In this particular example, insulating washer 600 includes ring 602 and composite layers 604.

Composite layers 604 has pattern 606. Each layer in composite layers 604 may have pattern 606. In other advantageous embodiments, different layers within composite layers 604 may have different patterns. These patterns are folded over ring 602 to form slots 608 in these examples. Composite layers 604 may be formed using various materials. For example, composite layers 604 may include ceramic fibers, glass fibers, or other suitable fibers or materials.

Ring 602 may be any structure that composite layers 604 may be folded over to form composite structure 610 with peripheral edge 612 in conjunction with ring 602. Ring 602 may take various forms. Ring 602 may be made from different materials such as, for example, without limitation, steel, ceramic, titanium, aluminum, nickel alloy, or some other suitable material. Ring 602 also may have different shapes, including, for example, a circle, a square, a rectangle, a pentagon, a hexagon, or some other suitable shape. Ring 602 provides rigidity to insulating washer 600 to retain a cover such as, for example, cover 520 in FIG. 5.

Further, composite layers 604 includes hole 614. Hole 614 may be part of pattern 606 or may be formed after composite layers 604 has been folded over onto ring 602. In these examples, peripheral edge 612 may be raised or higher relative to an inner portion of insulating washer 600. In these illustrative examples, hole 604 is centrally located with respect to an axis passing through ring 602.

In these examples, once composite layers 604 have been folded over ring 602, insulating washer 600 may be cured using any conventional curing process to form insulating washer 600.

Figure 7:
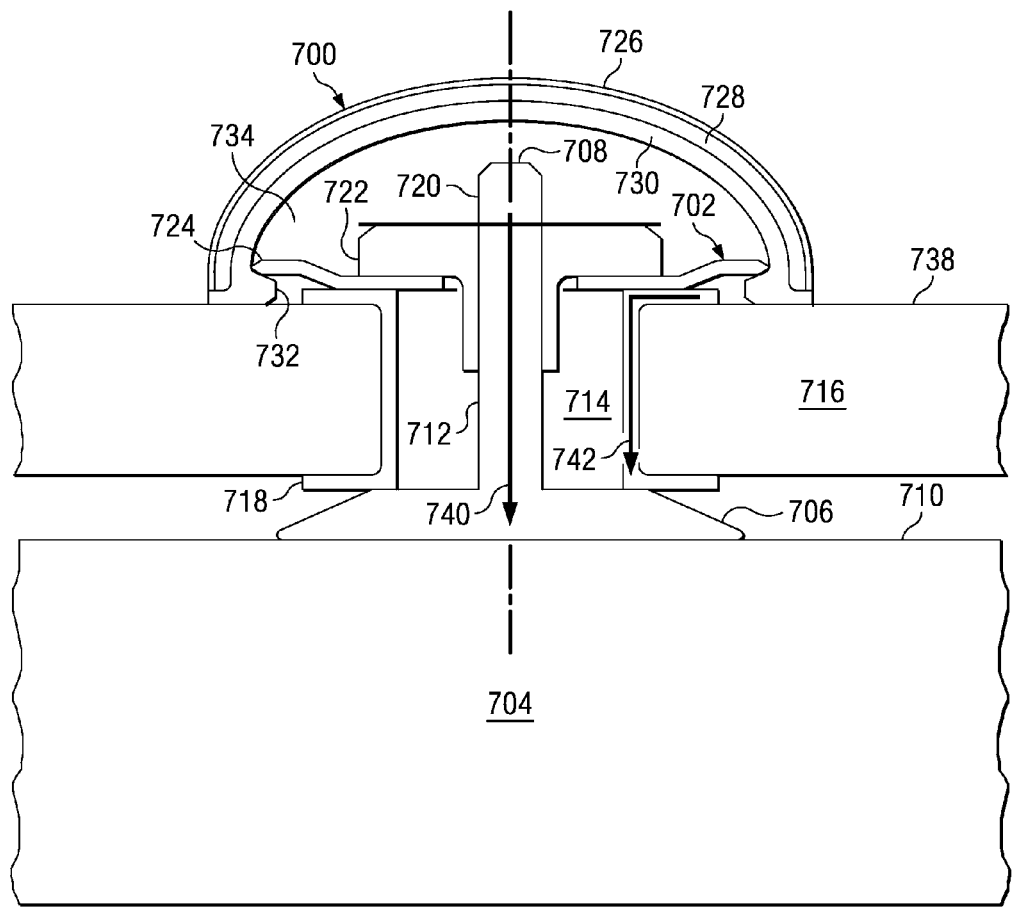
FIG. 7 is a diagram illustrating one implementation for a cover and washer in accordance with an advantageous embodiment.

With reference now to FIG. 7, a diagram illustrating one implementation for a cover and washer is depicted in accordance with an advantageous embodiment. In this example, cover 700 and washer 702 are examples of one manner in which cover 520 in FIG. 5 and washer 514 in FIG. 5 may be implemented. This illustration is a cross-sectional illustration of components.

In this illustrative example, composite panel 704 is bonded to or attached to base 706 of fastener 708 at surface 710. Shaft 712 of fastener 708 passes through hole 714 of insulation blanket 716. Hole 714 may be defined using grommet 718. In this depicted example, end 720 of fastener 708 may be secured using nut 722. Nut 722 may be secured with washer 702 in place.

Washer 702 includes peripheral edge 724, which is raised relative to inner portion of washer 702. Peripheral edge 724 may engage cover 700. In this example, cover 700 includes protective surface layer 726, insulation layer 728, and elastomer layer 730.

Peripheral edge 724 of washer 702 engages elastomer layer 730 to secure cover 700 to washer 702. Elastomer layer 730 includes edge 732 which may flex or bend to engage peripheral edge 724 to engage peripheral edge 724 of washer 702 in a manner that secures cover 700 to washer 702. The securing of cover 700 to washer 702 forms insulating volume 734.

As can be seen in this example, the combination of cover 700 and washer 702 forms insulating volume 734 in which air may be present to form an insulating layer for fastener 720. In this manner, nut 722 and/or end 720 of fastener 708 may be protected from heat that may be applied to surface 708 of insulation blanket 716.

As a result, heat may not conduct from nut 722 and/or fastener 708 down through shaft 712 to base 706. In this manner, heat may not conduct from fastener 708 to composite panel 704 and reduce the probability that delamination may occur. Heat will be prevented from conducting to composite panel 704 or the amount of heat conducted to composite panel 704 may be reduced though the use of cover 700 and washer 702 in these examples.

The use of an insulating washer for washer 702 also may prevent heat from conducting through grommet 718 to base 706 of fastener 708. In this manner, heat through path 740 or through path 742 may be reduced and/or eliminated through the use of cover 700 and washer 702. The reduction of heat conduction may reduce delamination in base 706, between base 706 and surface 710, and/or within composite panel 704.

Figure 8:
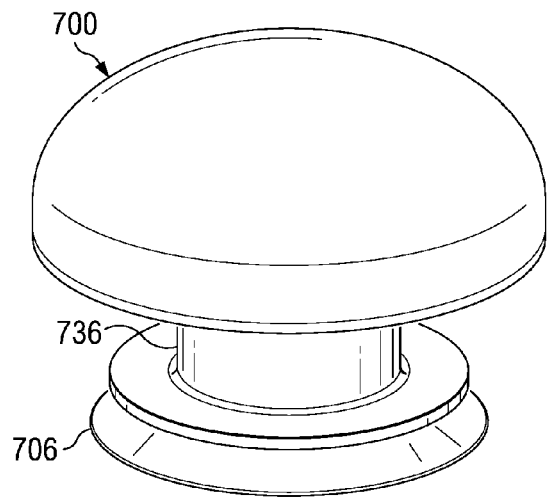
FIG. 8 is a perspective view of a cap secured to a washer on a fastener in accordance with an advantageous embodiment.

With reference now to FIG. 8, a perspective view of a cap secured to a washer on a fastener is depicted in accordance with an advantageous embodiment.

Figure 9:
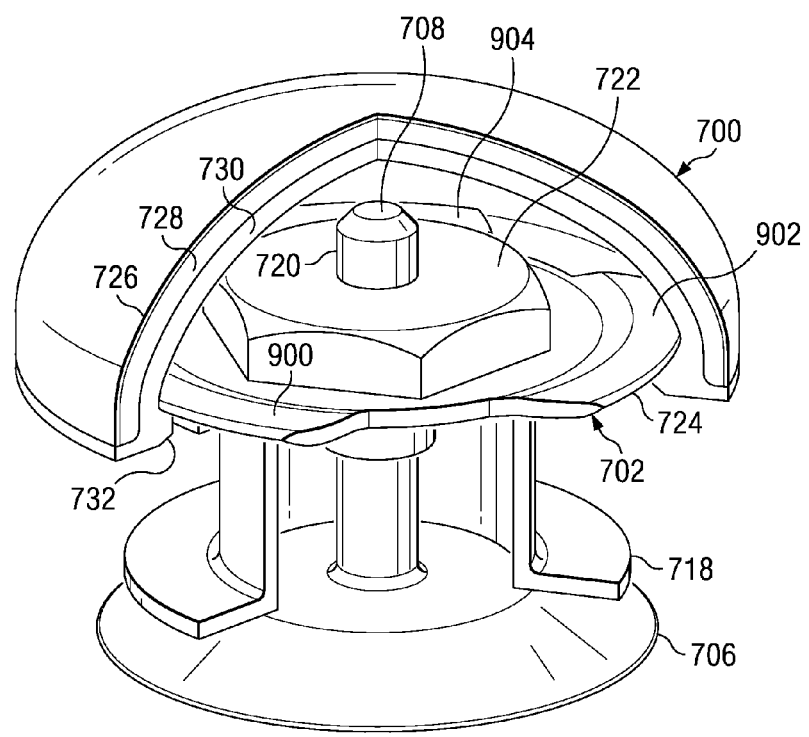
FIG. 9 is an exposed perspective view of a cap secured to a washer in accordance with an advantageous embodiment.

In FIG. 9, an exposed perspective view of a cap secured to a washer is depicted in accordance with an advantageous embodiment. As can be seen in this view, washer 702 is a tab washer having tabs 900, 902, and 904. These tabs have peripheral edge 724, which engages edge 732 of elastomer layer 730 in these examples. The use of tabs may be employed to increase the ease of the attaching cover 700 to washer 702 as well as the ease for removing cover 700 from washer 702.

Figure 10:
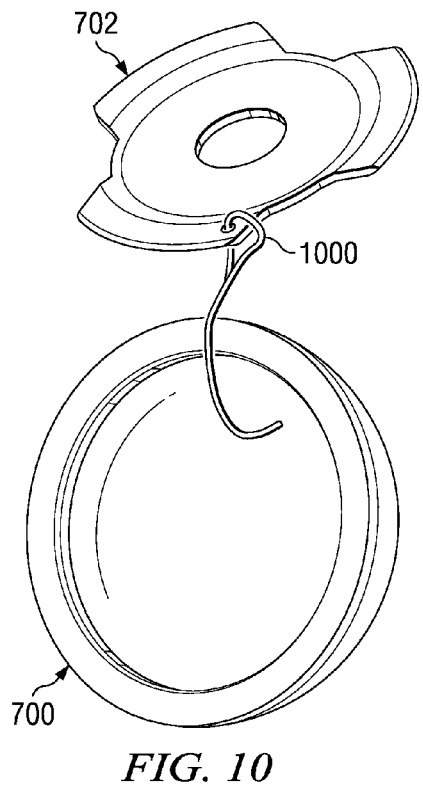
FIG. 10 is a diagram illustrating another configuration for a cover and washer in accordance with an advantageous embodiment.

With reference now to FIG. 10, a diagram illustrating another configuration for a cover and washer is depicted in accordance with an advantageous embodiment. In this example, washer 702 and cover 700 may be secured to each other using lanyard 1000. In this manner, the components may be kept approximate to each other. Further, lanyard 1000 may decrease the possibility that cover 700 may become separated from washer 702.

Figure 11:
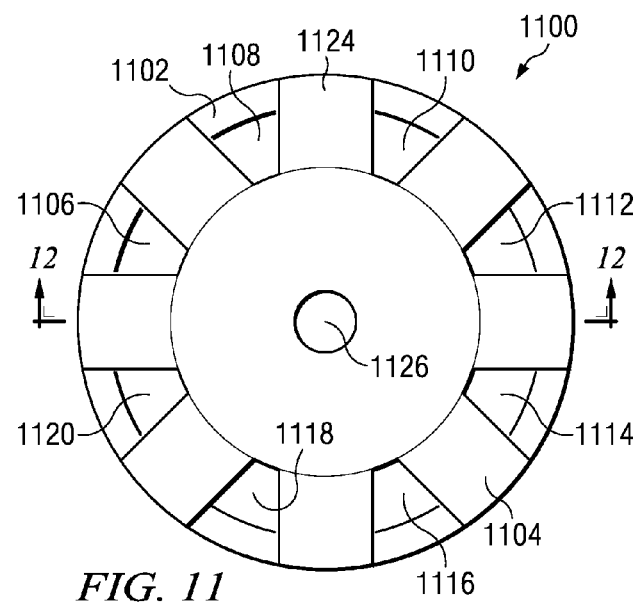
FIG. 11 is a diagram of a insulated washer in accordance with an advantageous embodiment.

With reference now to FIG. 11, a diagram of an insulated washer is depicted in accordance with an advantageous embodiment. In this example, washer 1100 is an example of one implementation of insulating washer 600 in FIG. 6. In this example, washer 1100 includes ring 1102 and composite structure 1104. Washer 1100 also includes hole 1126 within composite structure 1104 to receive a fastener.

Composite structure 1104 is formed from a set of layers folded over ring 1102. As can be seen, composite structure 1104 includes slots 1106, 1108, 1110, 1112, 1114, 1116, 1118, and 1120. Further, composite structure 1104 includes peripheral edge 1124.

Figure 12:
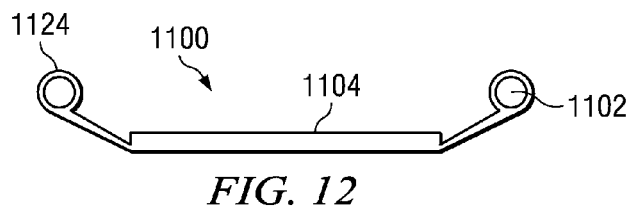
FIG. 12 is a cross-sectional view of a washer in accordance with an advantageous embodiment.

With reference now to FIG. 12, a cross-sectional view of washer 1102 is depicted along lines 12-12 in FIG. 11.

As can be seen from this cross-sectional view, peripheral edge 1124 is raised with respect to a central portion of composite structure 1104. In this example, composite structure 1104 is made from two layers.

Figure 13:
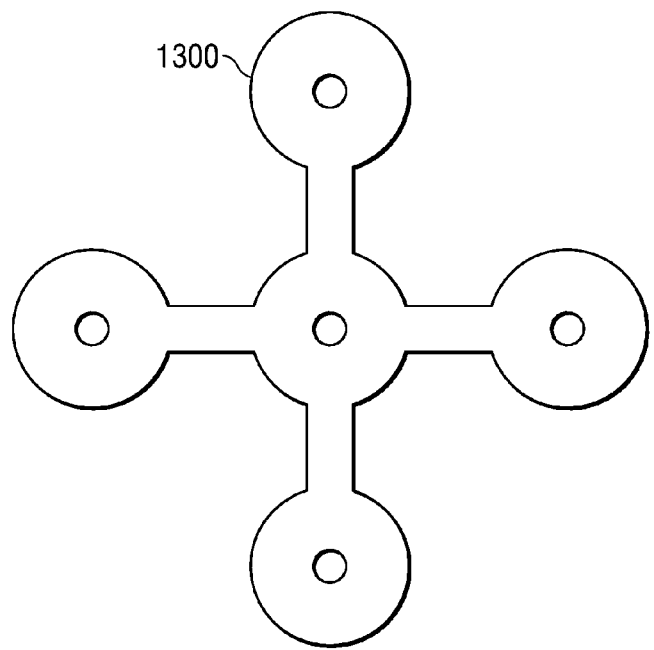
FIG. 13 is a diagram illustrating a layer in accordance with an advantageous embodiment.

With reference now to FIG. 13, a diagram illustrating a layer is depicted in accordance with an advantageous embodiment. In this example, layer 1300 is an example of a layer within composite structure 1104.

Figure 14:
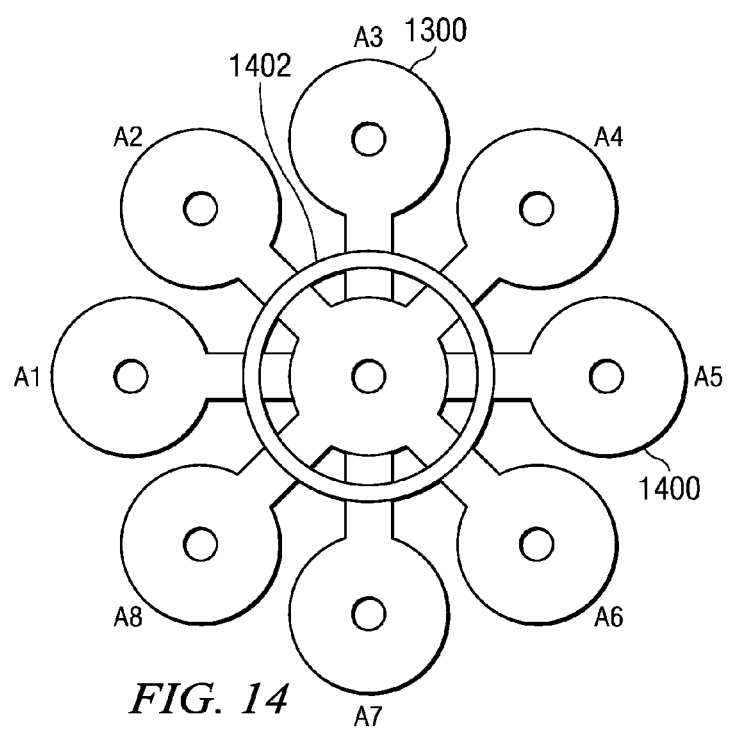
FIG. 14 is a diagram illustrating a layer in accordance with an advantageous embodiment.

With reference now to FIG. 14, a diagram illustrating layer 1400 with layer 1300. Layer 1400 is placed over layer 1300 at a 45 degree angle while layer 1300 is at a 0 degree angle. Further, in this example, ring 1402 is placed over layers 1300 and 1400. In this example, layer 1400 has tabs or ends A1, A3, A5, and A7. Layer 1400 has tabs A2, A4, A6, and A8. These tabs may be folded in the following sequence: A1, A4, A7, A2, A6, A3, A8, and A5.

The folding of these different layers forms the structure for washer 1100 as illustrated in FIG. 11. In its folded form, these components may be cured to form washer 1100.

Figure 15:
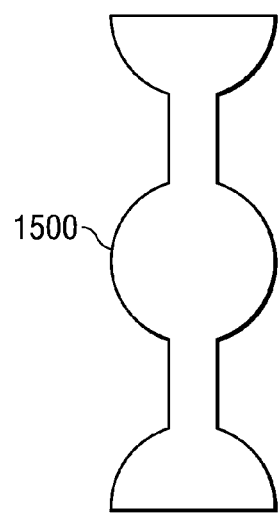
FIG. 15 is another example of a pattern for a layer for a washer in accordance with an advantageous embodiment.

With reference now to FIG. 15, another example of a pattern for a layer for washer 1100 is depicted in accordance with an advantageous embodiment. In this example, pattern 1500 is an example of a pattern that may be used to form composite structure 1104 in FIG. 11. With this type of pattern, four layers using pattern 1500 may be present.

Figure 16:
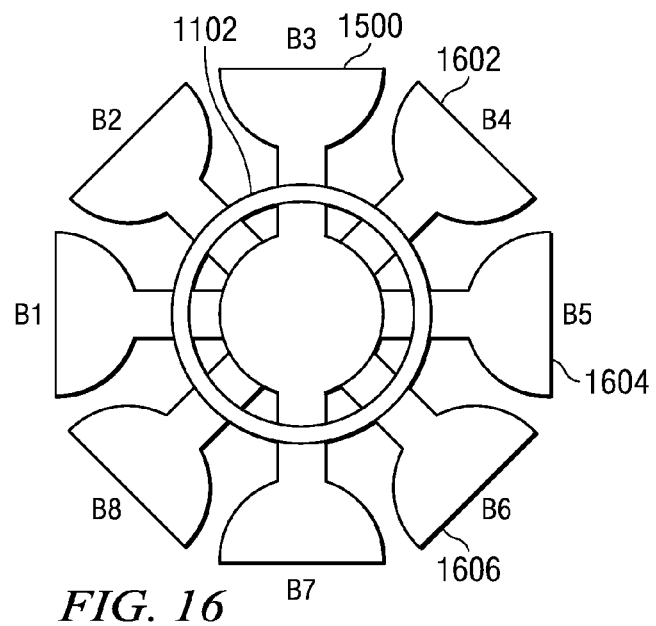
FIG. 16 is another diagram illustrating a layer in accordance with an advantageous embodiment.

With reference now to FIG. 16, layer 1600 is placed at a 0 degree angle, layer 1602 is placed at a 45 degree angle, layer 1604 is placed at a 90 degree angle, and layer 1606 is placed at a 135 degree angle. Layer 1500 has tabs B3 and B7, layer 1602 has tabs B4 and B8, layer 1604 has tabs B1 and B5, and layer 1606 has tabs B2 and B6. These tabs may be folded over ring 1102 in the following fold pattern: B6, B2, B1, B5, B3, B7, B4, and B8. This sequence of folding may be used to form a structure that may be cured to form washer 1100.

In these examples, the elastomer layer is made of a material that may take the form of a polymer having a property of elasticity. In other words, the polymer may allow the layer to be flexible.

Figure 17:
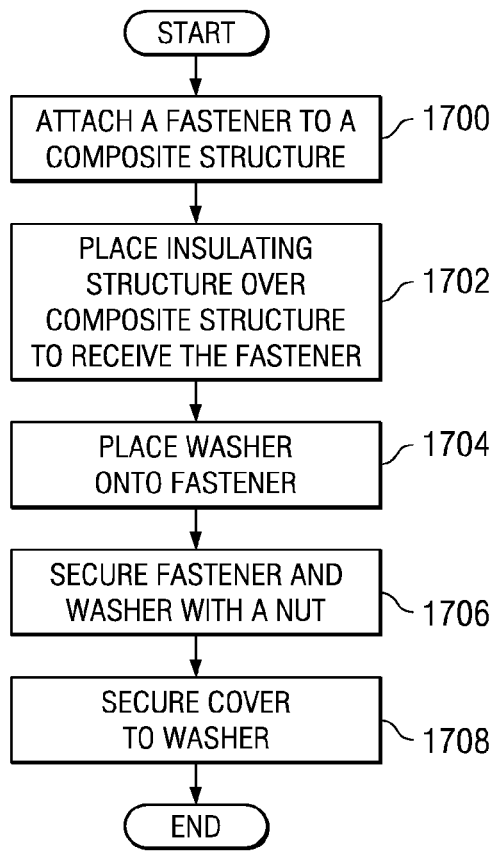
FIG. 17 is a flowchart of a process for insulating a fastener in accordance with an advantageous embodiment.

With reference now to FIG. 17, a flowchart of a process for insulating a fastener is depicted in accordance with an advantageous embodiment. This process may be implemented to form a structure such as the one illustrated in FIG. 7.

The process begins by attaching a fastener to a composite structure (operation 1700). In these examples, the composite structure may be a composite panel. The process then places an insulating structure over the composite structure to receive the fastener in a hole within the insulated structure (operation 1702). The insulating structure may be, for example, an insulation blanket.

The process then places a washer onto the fastener (operation 1704). In these examples, the washer may be an insulating washer. The fastener and washer are secured with a nut (operation 1706). In these examples, the nut is a complimentary fastener. The process then secures the cover to the washer (operation 1708) with the process terminating thereafter. In these examples, the cover has a peripheral edge that is designed to engage the peripheral edge of the washer in the manner to create an insulation volume. This insulation volume does not need to be air tight but may contain air to provide insulation for the fastener.

Figure 18:
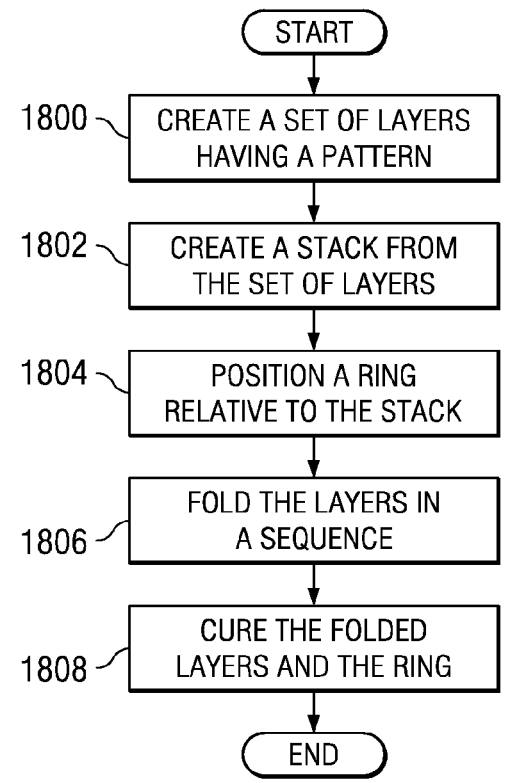
FIG. 18 is a flowchart of a process for manufacturing an insulating washer in accordance with an advantageous embodiment.

With reference now to FIG. 18, a flowchart of a process for manufacturing an insulating washer is depicted in accordance with an advantageous embodiment. The process illustrated in FIG. 18 may be used to manufacture an insulating washer such as insulating washer 600 in FIG. 6.

The process begins by creating a set of layers having a pattern (operation 1800). The process then creates a stack from the set of layers (operation 1802). In operation 1802, the different layers may be stacked at different orientations relative to each other. A center portion of each layer is aligned with the center portions of other layers in this example. A ring is positioned relative to the stack (operation 1804). The process then folds the layers in a sequence (operation 1806). These layers are folded over the ring to create a structure for the washer. The folded layers and the ring are cured (operation 1808) with the process terminating thereafter. The cured structure containing the folded layers in the ring form the insulating washer in these examples.

Thus, the different advantageous embodiments provide a method and apparatus for insulating a fastener from heat. This insulation provides an ability to reduce or eliminate delamination that may occur with a composite structure to which a fastener is attached. The different advantageous embodiments provide a cover and a washer that form an insulated space. Further, the cover of the different advantageous embodiments also may provide a further barrier for insulation against heat. The different advantageous embodiments also may employ an insulating washer to provide for further insulation against heat. In these examples, this insulating washer may take various forms including one made from composite materials.

In this manner, a metallic nut and a metallic portion of a fastener may be isolated from the ambient environment. This isolation may reduce the heat flow through the nut and the stud to a component to which the fastener is attached. This type of apparatus may be used for isolating fasteners used to attach thermal blankets in a jet engine thrust reverser. Of course, the different advantageous embodiments may be applied to other structures to which heat may be present.

The description of the different advantageous embodiments has been presented for purposes of illustration and description, and is not intended to be exhaustive or limited to the embodiments in the form disclosed. Many modifications and variations will be apparent to those of ordinary skill in the art. For example, although the different advantageous embodiments have been describe with respect to use in an aircraft, other advantageous embodiments may be used in other types of objects. For example, without limitation, other advantageous embodiments may be used in spacecraft, submarines, trucks, tanks, ships, power plants, manufacturing facilities, dams, engines, machinery, pumps, generators, and other suitable objects.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A washer comprising:
   a ring; and
   a set of composite layers folded over the ring so as to form folded composite layers, the folded composite layers forming a peripheral edge with slots, the folded composite layers further defining a hole in the washer, and wherein the peripheral edge is raised with respect to an inner portion of the folded composite layers.

2. The washer of claim 1, wherein the ring has a shape selected from one of a circular shape, a triangular shape, a square shape, a rectangular shape, and a hexagonal shape.

3. The washer of claim 1, wherein the ring comprises one of ceramic, aluminum, titanium, nickel alloy, and steel.

4. The washer of claim 1, wherein a composite layer within the set of composite layers has a pattern.

5. The washer of claim 4, wherein a second composite layer within the set of composite layers has a second pattern.

6. The washer of claim 4, wherein the set of composite layers has a pattern that forms a set of tabs at the peripheral edge.

7. The washer of claim 4, wherein the composite layer within the set of composite layers comprises at least one of ceramic fibers, glass fibers, and fiberglass fibers.

8. The washer of claim 1 wherein the hole is substantially centrally located in the washer.

9. An insulating washer comprising:
   a ring; and
   a plurality of composite layers folded over the ring to form a peripheral edge with slots around a hole that is centrally located in the insulating washer and wherein the peripheral edge is raised with respect to an inner portion of the plurality of composite layers, wherein each layer within the plurality of composite layers comprises fibers and a matrix material.

10. The insulating washer of claim 9, wherein a composite layer within the plurality of composite layers has a pattern.

11. The insulating washer of claim 10, wherein a second composite layer within the plurality of composite layers has a second pattern.

12. The insulating washer of claim 10, wherein the plurality of composite layers has a pattern that forms a set of tabs at a peripheral edge of the composite layer.

13. The insulating washer of claim 9, wherein the ring has a shape selected from one of a circular shape, a triangular shape, a square shape, a rectangular shape, and a hexagonal shape.

14. The insulating washer of claim 9, wherein the ring comprises one of ceramic, aluminum, titanium, nickel alloy, and steel.

15. An insulating washer assembly comprising:
   a ring;
   a first patterned composite layer;
   a second patterned composite layer, the second patterned composite layer positioned with respect to the first patterned composite layer at an angular orientation; and
   the first patterned composite layer and the second patterned composite layer being folded over the ring so as to form folded composite layers, the folded composite layers forming a peripheral edge with slots, the folded composite layers further defining a hole in the washer, and wherein the peripheral edge is raised with respect to an inner portion of the folded composite layers.

16. The insulating washer assembly of claim 15 wherein the angular orientation between the first patterned composite layer and the second patterned composite layer is substantially one of 45, 90, or 135 degrees.

17. The insulating washer assembly of claim 15, wherein the ring has a shape selected from one of a circular shape, a triangular shape, a square shape, a rectangular shape, and a hexagonal shape.

18. The insulating washer assembly of claim 15, wherein the ring comprises one of ceramic, aluminum, titanium, nickel alloy, and steel.

19. The insulating washer assembly of claim 15 wherein the hole is substantially centrally located in the washer.

* * * * *